(12) United States Patent
Chen

(10) Patent No.: US 11,357,210 B2
(45) Date of Patent: Jun. 14, 2022

(54) FEEDING APPARATUS

(71) Applicant: CHICONY ELECTRONICS CO., LTD., New Taipei (TW)

(72) Inventor: Chien-Yueh Chen, New Taipei (TW)

(73) Assignee: CHICONY ELECTRONICS CO., LTD., New Taipei (TW)

(*) Notice: Subject to any disclaimer, the term of this patent is extended or adjusted under 35 U.S.C. 154(b) by 473 days.

(21) Appl. No.: 16/434,790

(22) Filed: Jun. 7, 2019

(65) Prior Publication Data

US 2020/0236900 A1 Jul. 30, 2020

(30) Foreign Application Priority Data

Jan. 29, 2019 (TW) .................................. 108103317

(51) Int. Cl.
*A01K 5/02* (2006.01)
*G05B 15/02* (2006.01)
(52) U.S. Cl.
CPC .............. *A01K 5/02* (2013.01); *A01K 5/0275* (2013.01); *G05B 15/02* (2013.01)
(58) Field of Classification Search
CPC .......... A01K 5/00; A01K 5/0114; A01K 5/02; A01K 5/0291; A01K 5/0275; A01K 7/02
See application file for complete search history.

(56) References Cited

U.S. PATENT DOCUMENTS

| 5,134,292 A * | 7/1992 | Segawa | G08B 13/193 |
| | | | 250/342 |
| 6,684,819 B1 * | 2/2004 | Locke | A01K 15/025 |
| | | | 119/707 |
| 2012/0229283 A1 * | 9/2012 | McKenna | G08B 25/10 |
| | | | 340/584 |
| 2016/0216158 A1 * | 7/2016 | Yang | G01J 5/04 |
| 2016/0295836 A1 * | 10/2016 | Cheng | A01K 15/025 |
| 2018/0295807 A1 * | 10/2018 | Hsu | A01K 5/0114 |
| 2019/0000036 A1 | 1/2019 | Hong | |

(Continued)

FOREIGN PATENT DOCUMENTS

| CN | 107439407 A | 12/2017 |
| CN | 109197632 A | 1/2019 |
| KR | 20180065850 A * | 6/2018 |

(Continued)

*Primary Examiner* — Joshua D Huson
*Assistant Examiner* — Edgar Reyes
(74) *Attorney, Agent, or Firm* — Muncy, Geissler, Olds & Lowe, P.C.

(57) ABSTRACT

A feeding apparatus, disposed in a detecting room having therein a target object, includes a fixing element, at least one target sensing unit, a rotating element, a driving module, and a control unit. The fixing element includes at least one lens disposed on a sidewall of the fixing element. The lens converges an infrared radiation in the detecting room onto the target sensing unit which then generates a position signal corresponding to the target object. The rotating element is disposed on one side of the fixing element. The rotating element includes a discharge channel. The driving module is connected to the rotating element. The control unit is coupled to the target sensing unit and the driving module to receive a position signal from the target sensing unit and control the driving module to drive the rotating element according to the position signal.

14 Claims, 4 Drawing Sheets

(56) References Cited

U.S. PATENT DOCUMENTS

2019/0357497 A1\* 11/2019 Honchariw .......... A01K 15/025
119/707

FOREIGN PATENT DOCUMENTS

| WO | WO-2014134606 A1 \* | 9/2014 | ................ G08B 5/22 |
| WO | WO-2017192957 A1 \* | 11/2017 | ........... A01K 5/0225 |
| WO | WO-2020037964 A1 \* | 2/2020 | ........... A01K 5/0225 |

\* cited by examiner

FEEDING APPARATUS

BACKGROUND

1. Technical Field

The present disclosure relates to feeding apparatuses and, more particularly, to a pet-oriented feeding apparatus.

2. Description of the Related Art

In general, the conventional way to feed pets entails putting pet food in pet food trays or any alternative containers. Considering that pet keepers on a trip cannot feed pets if the pet keepers leave the pets at home, an automatic feeding apparatus whereby a pet keeper puts pet food in a food storage chamber (material-containing chamber) is commercially available. The feeding apparatus provides a meal of pet food to pets at a predetermined (eating) time.

Furthermore, another automatic feeding apparatus capable of flinging pet food toward a pet and conducive to enhanced interaction between the pet and pet keeper is commercially available. However, the flinging automatic feeding apparatus fails to detect the pet's position, not mention that fling the pet food toward pet timely. As a result, the pet keeper has to control the flinging automatic feeding apparatus from a distance, so as to fling pet food timely. Furthermore, with the pet food being flung in an invariable direction and from an invariable angle, the pet might not even notice the pet food flung. Therefore, the prior art still has room for improvement.

SUMMARY

In view of the aforesaid drawbacks of the prior art, it is an objective of the present disclosure to provide a feeding apparatus which comprises a lens, target sensing unit, rotating element and driving module with a view to overcoming drawbacks of the prior art, namely conventional automatic feeding apparatuses fail to detect a pet's position and in consequence fail to fling the pet food toward pet timely.

In order to achieve the above and other objectives, the present disclosure provides a feeding apparatus is adapted to be disposed in a detecting room having therein a target object. The feeding apparatus comprises a fixing element, at least one target sensing unit, a rotating element, a driving module and a control unit. The fixing element comprises at least one lens. The lens is disposed on a sidewall of the fixing element. The target sensing unit is disposed in the fixing element and corresponds in position to the lens. The lens focuses a distribution of an infrared radiation in the detecting room on the target sensing unit. The target sensing unit generates a position signal corresponding to the target object according to the distribution of the infrared radiation. The rotating element is disposed on one side of the fixing element and comprises a discharge channel. The driving module is disposed in the fixing element and connected to the rotating element. The control unit is coupled to the target sensing unit and the driving module. The control unit is adapted to receive the position signal from the target sensing unit and control the driving module to drive the rotating element according to the position signal, so as for the discharge channel is aimed at the target object.

In an embodiment of the present disclosure, the lens is a Fresnel lens, and the target sensing unit is a pyroelectric target sensing unit.

In an embodiment of the present disclosure, the fixing element comprises two said lenses symmetrically disposed on the sidewall.

In an embodiment of the present disclosure, two said lenses each have an arc angle of 180 degrees.

In an embodiment of the present disclosure, two said lenses correspond in position to a rotation axis of the rotating element radially.

In an embodiment of the present disclosure, the feeding apparatus comprises four said target sensing units, two of the target sensing units correspond in position to one of the lenses, and the other two of the target sensing units correspond in position to the other lens.

In an embodiment of the present disclosure, the at least one target sensing unit corresponds in position to a rotation axis of the rotating element radially.

In an embodiment of the present disclosure, the driving module comprises a rotating shaft and a drive unit. The drive unit is connected to the rotating shaft and coupled to the control unit. The rotating shaft is connected to the rotating element.

In an embodiment of the present disclosure, a recess is disposed at a bottom of the rotating element, and the rotating shaft is connected to the recess.

In an embodiment of the present disclosure, the rotating element further comprises a fixing pad fixed to one end of the rotating shaft which passes through the recess.

In an embodiment of the present disclosure, the rotating element comprises a material-containing chamber disposed in the rotating element, and the discharge channel is in communication with the material-containing chamber.

In an embodiment of the present disclosure, the discharge channel is obliquely disposed at the rotating element.

In an embodiment of the present disclosure, the discharge channel has an inlet and an outlet, and the outlet is at a greater height than the inlet.

In an embodiment of the present disclosure, the outlet is disposed on a side relative to a rotation axis of the rotating element.

In an embodiment of the present disclosure, the feeding apparatus further comprises an image capturing module with a wireless transmission module.

In an embodiment of the present disclosure, the image capturing module is disposed above the discharge channel.

In an embodiment of the present disclosure, the rotating element is disposed on an upper side of the fixing element.

In conclusion, a feeding apparatus provided according to the present disclosure comprises a fixing element, a target sensing unit, a rotating element, a driving module and a control unit, with a lens disposed on a sidewall of the fixing element and corresponding in position to the target sensing unit. Therefore, owing to the lens and the target sensing unit, the feeding apparatus can detect a pet's position and generate a position signal. The control unit controls the driving module to drive the rotating element according to the position signal such that a discharge channel is aimed at a target object (pet), thereby flinging a material (pet food) toward the target object. Therefore, the feeding apparatus of the present disclosure detects the position of the target object (pet) and then controllably aims the discharge channel at the target object. Not only is the material timely flung to the target object without the user's (pet keeper's) controlling the feeding apparatus from a distance, but the material is also precisely flung to the target object.

DETAILED DESCRIPTION OF THE EMBODIMENTS

The present disclosure is hereunder illustrated by preferred embodiments.

Figure 1:
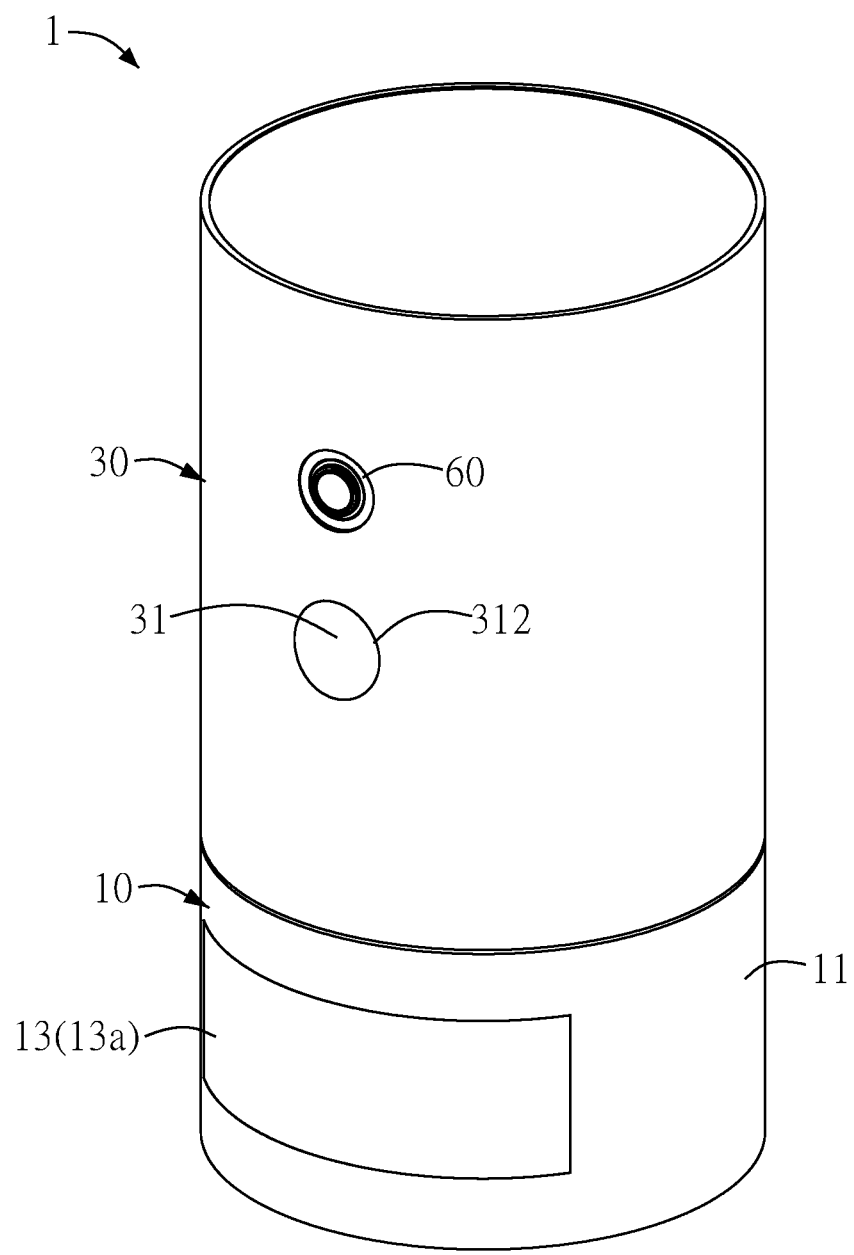
FIG. 1 is a perspective view of a feeding apparatus according to an embodiment of the present disclosure.
Figure 2:
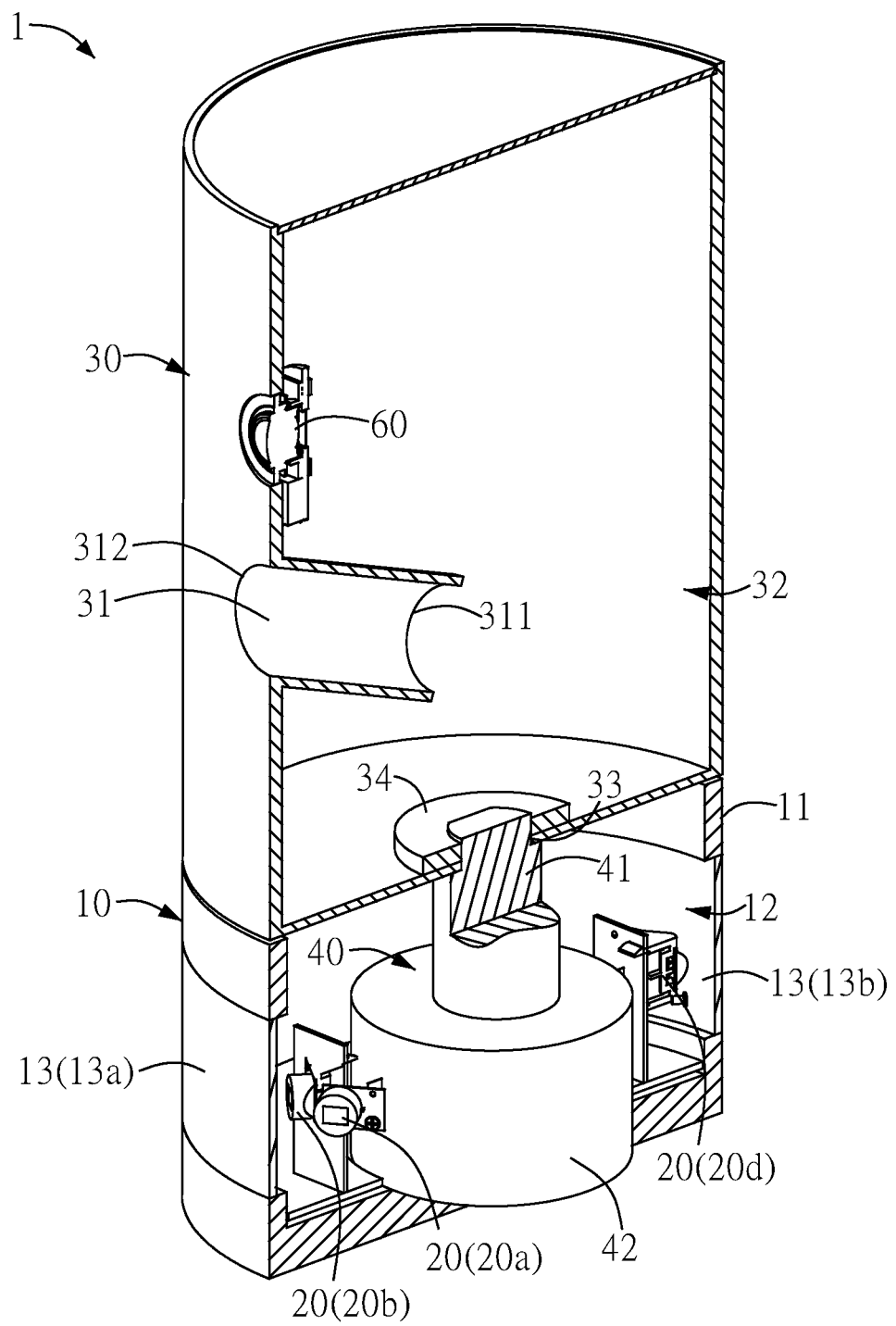
FIG. 2 is a cutaway view of the feeding apparatus shown in FIG.
Figure 3:
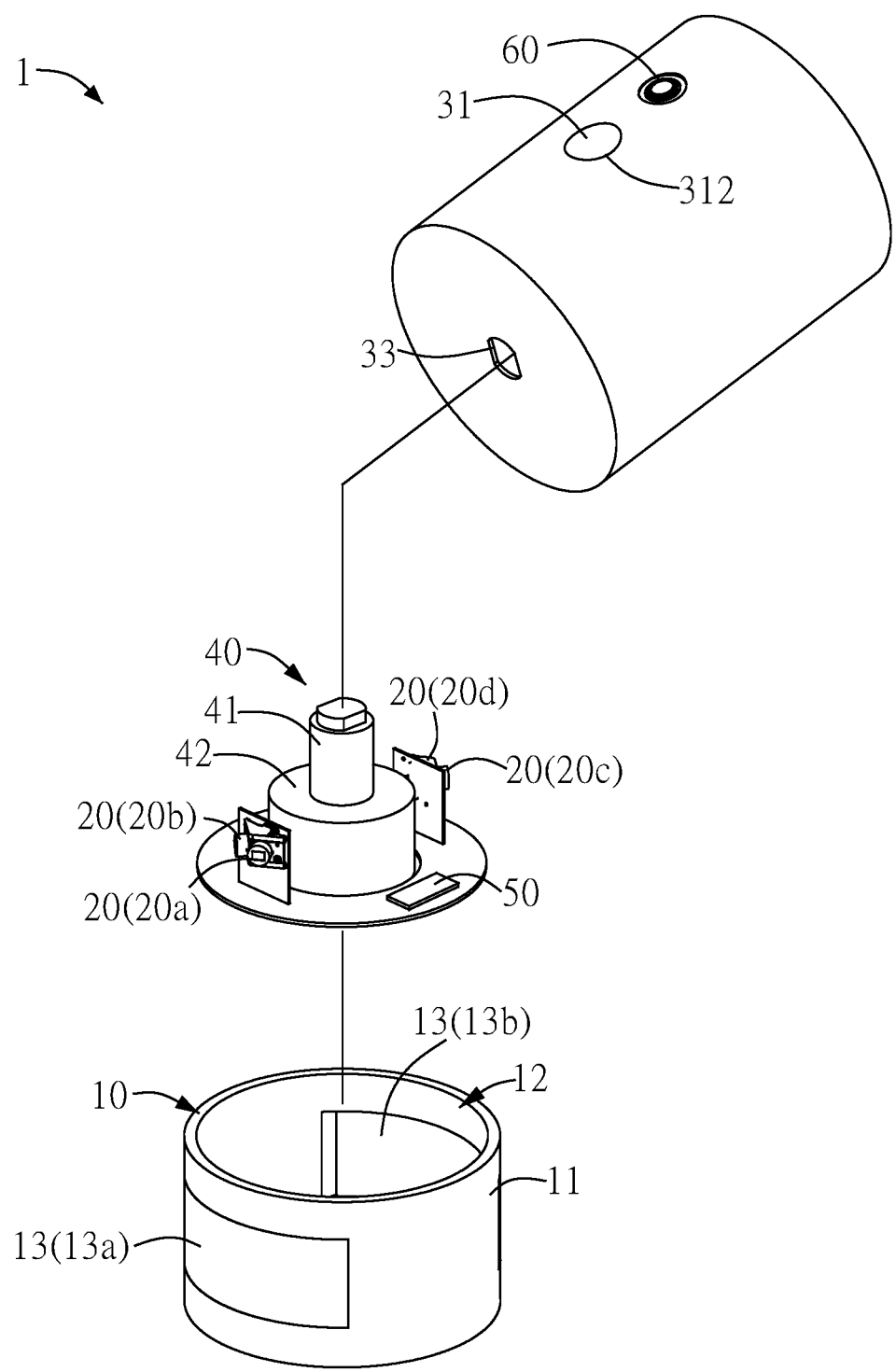
FIG. 3 is an exploded view of the feeding apparatus shown in FIG. 1.

FIG. 1 is a perspective view of a feeding apparatus according to an embodiment of the present disclosure. FIG. 2 is a cutaway view of the feeding apparatus shown in FIG. 1. FIG. 3 is an exploded view of the feeding apparatus shown in FIG. 1. Referring to FIG. 1, FIG. 2 and FIG. 3, in this embodiment, a feeding apparatus 1 is configured to fling a material toward a target object. In particular, the feeding apparatus 1 is applicable to a flinging automatic feeding apparatus for flinging pet food toward a pet to be fed. In this embodiment, the pet food or a pet snack is hereinafter referred to as the material, whereas the pet to be fed is hereinafter referred to as the target object. In another embodiment, the material is a toy that the pet plays with. A user (pet keeper) can put the feeding apparatus 1 in a living room, a pet playroom or the like, which is hereinafter referred to as the detecting room. When there is a target object (pet) in the detecting room has, the feeding apparatus 1 in this embodiment starts to operate, flinging the material toward the target object.

The feeding apparatus 1 comprises a fixing element 10, at least one target sensing unit 20, a rotating element 30, a driving module 40 and a control unit 50. In this embodiment, the fixing element 10 is cylindrical and has a sidewall 11 and a receiving space 12. The fixing element 10 comprises at least one lens 13 disposed on the sidewall 11 of the fixing element 10. One of the surfaces of each of the lens 13 faces the receiving space 12. An infrared radiation in the detecting room is incident on the opposing surface of the lens 13. The target sensing unit 20 is disposed within the receiving space 12 of the fixing element 10. The target sensing unit 20 corresponds in position to the lens 13.

The at least one lens 13 focuses the distribution of the infrared radiation in the detecting room on the target sensing unit 20. That is, the at least one lens 13 enables the infrared radiation to fall on the target sensing unit 20 by refraction or reflection. Homeotherms (hereunder exemplified by a pet) are inherently capable of emitting infrared radiation, for example, emitting, at 37° C., electromagnetic radiation with a wavelength peak of around 10 μm which falls within infrared wavelength range (0.75~1,000 μm). Preferably, the lens 13 is a Fresnel lens has convergence rings and thereby restricts the wavelength peak of an incident ray to around 10 μm. The succession of concentric rings on the surface of the lens 13 increases the scope of the distribution of the infrared radiation sensed by the lens 13.

The target sensing unit 20 corresponds in position to the at least one lens 13 and thereby senses the distribution of the infrared radiation converged by the lens 13. Preferably, the target sensing unit 20 is a pyroelectric infrared sensor (PIR sensor). The casing of the pyroelectric infrared sensor has a band-pass filter for filtering out infrared of most wavelengths but allowing infrared with a wavelength peak of around 10 μm to pass, so as to sense the infrared radiation at temperature close to the pet's body temperature.

In this embodiment, the fixing element 10 has a curved sidewall 11. The fixing element 10 comprises two curved lenses 13, such as lenses 13a and 13b. The two lenses 13a, 13b each have an arc angle of 180 degrees. The two lenses 13a, 13b are symmetrically disposed on the sidewall 11. Referring to FIG. 2, the two lenses 13a, 13b are disposed on the front side and the rear side of the fixing element 10, respectively. In this embodiment, the feeding apparatus 1 comprises four target sensing units 20 (such as infrared target sensing units 20a, 20b, 20c, and 20d). The two infrared target sensing units 20a, 20b correspond in position to one of the lenses 13, for example, the lens 13a on the front side. The other two infrared target sensing units 20c, 20d correspond in position to the other lens 13b on the rear side.

The target sensing units 20 generate a position signal corresponding to the target object (pet) according to the distribution of the infrared radiation. Referring to FIG. 3, assuming the target object (pet) is behind and on the right of the feeding apparatus 1, the target sensing unit 20c, which is behind the feeding apparatus 1 and faces rightward, can sense the distribution of the infrared radiation of a higher energy level, and in consequence the position signal thus generated carries the information of that the target object is behind and on the right of the feeding apparatus 1. Therefore, the four target sensing units 20a, 20b, 20c, 20d and the two lenses 13a, 13b disposed on the front side and the rear side of the fixing element 10, respectively, detect the distribution of the infrared radiations propagating in different directions within the detecting room and thereby detect the target object (pet) from a view angle of up to 360 degrees.

In another embodiment not shown, the feeding apparatus 1 includes only two target sensing units 20. One target sensing unit 20 corresponds in position to one of the lenses 13, for example, the lens 13a in the front. The other target sensing unit 20 corresponds in position to the other lens 13b at the rear. Therefore, at least one lens 13 and at least one target sensing unit 20 corresponding in position thereto can implement sensing in a visual field of 180 degrees. Assuming the target object (pet) is behind the feeding apparatus 1, the infrared target sensing unit 20 which corresponds in position to the lens 13b at the rear, can sense the distribution of the infrared radiation of a higher energy level, and in consequence the position signal thus generated carries the information of that the target object is behind the feeding apparatus 1. Therefore, the two target sensing units 20 and the two lenses 13a, 13b disposed on the front side and rear side of the fixing element 10, respectively, detect the distribution of the infrared radiations propagating in different directions within the detecting room and thereby detect the target object (pet) from a view angle of up to 360 degrees.

Afterward, the control unit 50 receives the position signal from the target sensing unit 20 and controls the rotating element 30 to fling the material (pet food) toward the target object (pet). The description below deals with the structural features and connections of the rotating element 30, the driving module 40 and the control unit 50 and then their operations.

The rotating element 30 is disposed on one side of the fixing element 10. Referring to FIG. 1 and FIG. 2, the rotating element 30 is disposed on the upper side of the fixing element 10. The user (pet keeper) can put the fixing element 10 of the feeding apparatus 1 on a supportive surface, such as a desktop or the floor, such that the rotating element 30 is disposed on the upper side of the fixing element 10. In this embodiment, the rotating element 30 comprises a discharge channel 31 and a material-containing chamber 32. The material-containing chamber 32 is disposed in the rotating element 30; hence, internal space of the rotating element 30 is occupied by the material-containing chamber 32, allowing the user to put the material (pet food) in the material-containing chamber 32.

The discharge channel 31 is in communication with the material-containing chamber 32. The discharge channel 31 has an inlet 311 and an outlet 312. The inlet 311 is in communication with the material-containing chamber 32 such that the material enters the discharge channel 31 through the inlet 311. In this embodiment, the discharge channel 31 is disposed in the material-containing chamber 32, the inlet 311 is disposed in the material-containing chamber 32, and the outlet 312 is disposed on a sidewall of the rotating element 30, and in consequence the rotating element 30 has a neat appearance, that is, not having any protrusion despite the existence of the discharge channel 31. However, the present disclosure is not restrictive of the position of the discharge channel 31. In another embodiment, the discharge channel 31 is disposed outside the material-containing chamber 32. For instance, the discharge channel 31 protrudes from the sidewall of the rotating element 30, and the inlet 311 is disposed on the sidewall of the rotating element 30, allowing the inlet 311 to be in communication with the material-containing chamber 32.

The material-containing chamber 32 has therein a flinging mechanism (not shown), and the flinging mechanism is located in the vicinity of the inlet 311. The flinging mechanism (such as a push rod) pushes, from the inlet 311, the material in the discharge channel 31 so as to move the material out of the feeding apparatus 1, thereby supplying the material (pet food) by flinging it. Persons skilled in the art can implement the aforesaid flinging mechanism by making reference to conventional flinging automatic feeding apparatuses; hence, for the sake of brevity, details of the structural features of the flinging mechanism are not described herein. Preferably, the discharge channel 31 is obliquely disposed at the rotating element 30. As shown in FIG. 2, the outlet 312 is at a greater height than the inlet 311 such that the discharge channel 31 runs obliquely. With the discharge channel 31 running obliquely, the material thus pushed outward can exit the feeding apparatus 1 by being ejected upward, so as to emulate the user's flinging pet food or toys and thereby enable the user's interesting interaction with the pet.

The driving module 40 is disposed in the fixing element 10 and connected to the rotating element 30 such that the driving module 40 drives the rotating element 30 to rotate relative to the fixing element 10. In this embodiment, the driving module 40 comprises a rotating shaft 41 and a drive unit 42. The drive unit 42 is connected to the rotating shaft 41. The drive unit 42 is a motor. The drive unit 42 supplies power to the rotating shaft 41 so as for the rotating shaft 41 to rotate. The rotating shaft 41 is connected to the rotating element 30. Preferably, a recess 33 is disposed at the bottom of the rotating element 30, and the rotating shaft 41 is connected to the recess 33. Preferably, the rotating element 30 further has a fixing pad 34, such as a ring-shaped fixing pad. One end of the rotating shaft 41 which passes through the recess 33 and enters the material-containing chamber 32 is fixed in place inside the material-containing chamber 32 by the fixing pad 34, so as to achieve fixation and a hermetic seal simultaneously. The drive unit 42 in operation drives the rotating shaft 41 whereby the rotating element 30 rotates relative to the fixing element 10.

In this embodiment, the two lenses 13 (13a, 13b) correspond in position to the rotating shaft 41 radially and are disposed on two opposing sides of the rotating shaft 41, respectively. Similarly, the target sensing units 20 (20a, 20b, 20c, 20d) correspond in position to the rotating shaft 41 radially and are disposed on two opposing sides of the rotating shaft 41 to operate in conjunction with the lenses 13 (13a, 13b), respectively, so as to implement sensing in a visual field of 360 degrees. In particular, the lens 13a and the target sensing units 20a, 20b implement sensing in a front visual field of 180 degrees, whereas the lens 13b and the target sensing units 20c, 20d implement sensing in a rear visual field of 180 degrees. The rotating shaft 41 is perpendicular to a bottom surface of the rotating element 30. The bottom surface of the rotating element 30 is disposed on a top surface of the fixing element 10 and the rotating element 30 rotates by 360 degrees about a rotation axis defined as the extension direction of the rotating shaft 41. The outlet 312 is disposed on a side relative to the rotation axis of the rotating element 30 such that the rotating shaft 41 drives the rotating element 30 to rotate, thereby allowing the discharge channel 31 to be aimed at whatever position in a visual field of 360 degrees.

Figure 4:
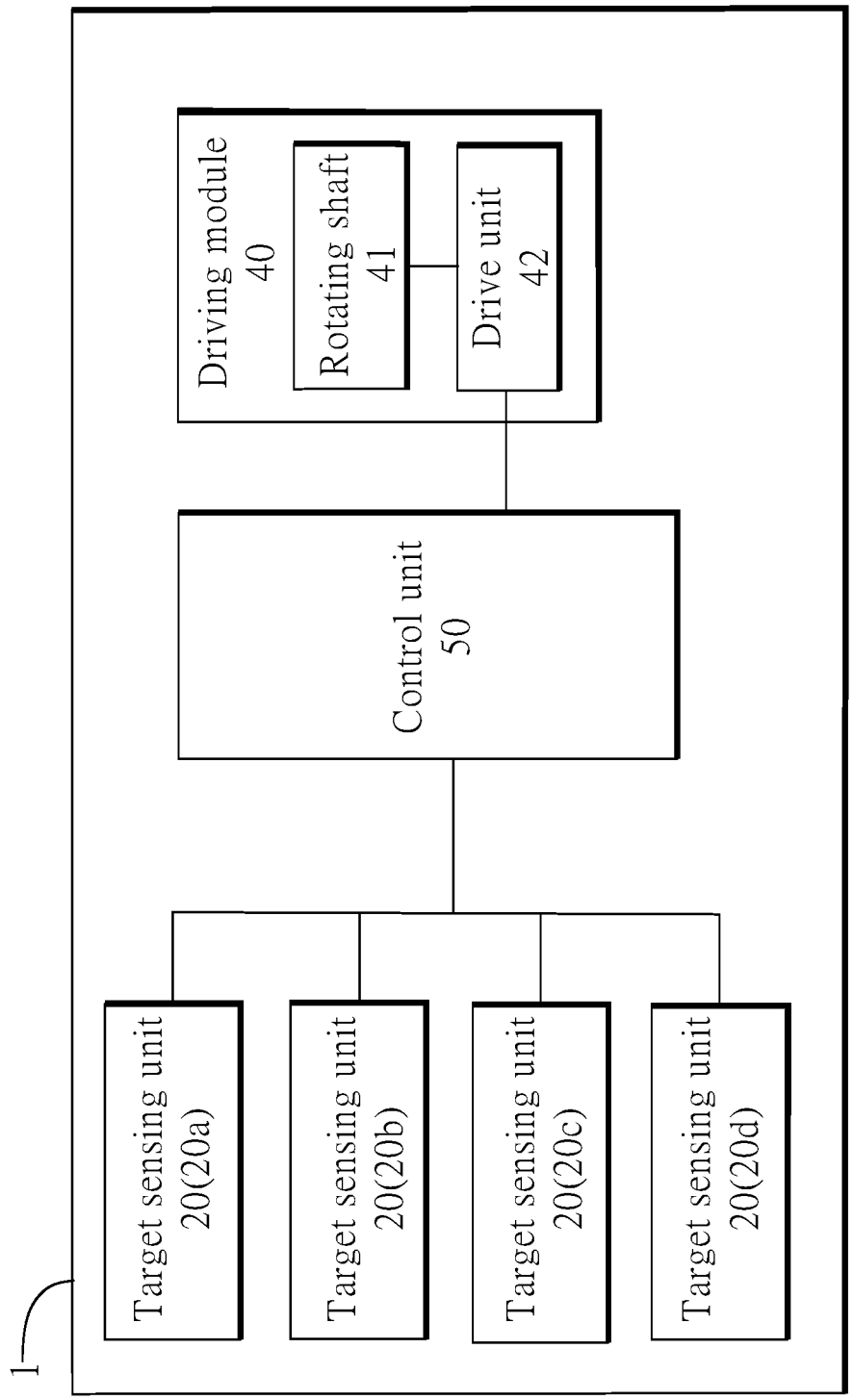
FIG. 4 is a block diagram of the feeding apparatus shown in FIG. 1.

FIG. 4 is a block diagram of the feeding apparatus shown in FIG. 1. Referring to FIG. 3 and FIG. 4, in this embodiment, the control unit 50 is coupled to the drive unit 42 of the driving module 40. The control unit 50 is coupled to the target sensing unit 20. In this embodiment, the control unit 50 is coupled to each of the target sensing units 20a, 20b, 20c, 20d such that the control unit 50 receives the position signal from each of the target sensing units 20a, 20b, 20c, 20d. As mentioned before, as a specific example, the target object is behind and on the right of the feeding apparatus 1, and in consequence the control unit 50 can receive from the target sensing unit 20c the position signal which carries the information of that the target object is behind and on the right of the feeding apparatus 1. Then, the control unit 50 controls the drive unit 42 to operate according to the position signal such that the rotating shaft 41 drives the rotating element 30 to rotate and reach the position (i.e., the aforesaid rear and rightward position) at which the discharge channel 31 is aimed at the target object. In short, the control unit 50 controls the driving module 40 to drive the rotating element 30 such that the discharge channel 31 is aimed at the target object.

In this embodiment, the control unit 50 is coupled to the flinging mechanism. When the discharge channel 31 is rotated to such an extent to be aimed at the target object, the control unit 50 controls the flinging mechanism to operate and thereby fling the material in the discharge channel 31 toward the target object. This embodiment is not restrictive of the position of the control unit 50, but the control unit 50 is preferably disposed in the fixing element 10. In another embodiment, the control unit 50 is disposed at the rotating element 30 or even outside the feeding apparatus 1, but the present disclosure is not limited thereto. The control unit 50 only needs to be coupled to the target sensing unit 20, the driving module 40, and the flinging mechanism in order for the aforesaid operations to take place.

Preferably, in this embodiment, the feeding apparatus 1 further comprises an image capturing module 60 with a wireless transmission module so as to be in communication connection with another electronic apparatus (such as a computer or smartphone) held by the user (pet keeper). Preferably, the image capturing module 60 is disposed above the discharge channel 31 and adapted to capture images from the surroundings of the feeding apparatus 1; hence, if the pet (target object) is in the vicinity of the feeding apparatus 1, the pet's images can be captured by the image capturing module 60. Therefore, the wireless transmission module sends the images to the user's electronic apparatus, allowing the user to watch the pet from a distance. The feeding apparatus 1 further has some other components conducive to interaction, such as a speaker and a receiver, but the present disclosure is not limited thereto.

In conclusion, a feeding apparatus provided according to the present disclosure comprises a fixing element, a target sensing unit, a rotating element, a driving module and a control unit, with a lens disposed on a sidewall of the fixing element and corresponding in position to the target sensing unit. Therefore, owing to the lens and the target sensing unit, the feeding apparatus can detect a pet's position and generate a position signal. The control unit controls the driving module to drive the rotating element according to the position signal such that a discharge channel is aimed at a target object (pet), thereby flinging a material (pet food) toward the target object. Therefore, the feeding apparatus of the present disclosure detects the position of the target object (pet) and then controllably aims the discharge channel at the target object. Not only is the material automatically flung to the target object without the user's (pet keeper's) controlling the feeding apparatus from a distance, but the material is also precisely flung to the target object.

The aforesaid embodiments serve an illustrative purpose. The scope of disclosure of the present disclosure shall be defined by the appended claims rather than restricted to the aforesaid embodiments.

What is claimed is:

1. A feeding apparatus, adapted to be disposed in a detecting room having therein a target object, the feeding apparatus comprising:
   a fixing element comprising two lenses symmetrically disposed on a sidewall of the fixing element;
   four target sensing units disposed in the fixing element, wherein two of the target sensing units correspond in position to one of the lenses, and the other two of the target sensing units correspond in position to the other lens, wherein the lenses focus a distribution of an infrared radiation in the detecting room on the target sensing units, and the target sensing units generate a position signal corresponding to the target object according to the distribution of the infrared radiation;
   a rotating element disposed on one side of the fixing element and comprising a discharge channel;
   a driving module disposed in the fixing element and connected to the rotating element; and
   a control unit coupled to the target sensing units and the driving module, wherein the control unit is adapted to receive the position signal from the target sensing units and control the driving module to drive the rotating element according to the position signal so as for the discharge channel to be aimed at the target object.

2. The feeding apparatus of claim 1, wherein each of the lenses is a Fresnel lens, and each of the target sensing units is a pyroelectric target sensing unit.

3. The feeding apparatus of claim 1, wherein two said lenses each have an arc angle of 180 degrees.

4. The feeding apparatus of claim 1, wherein two said lenses are positioned radially away from the rotating element.

5. The feeding apparatus of claim 1, wherein the target sensing units correspond in position to a rotation axis of the rotating element radially.

6. The feeding apparatus of claim 1, wherein the driving module comprises a rotating shaft and a drive unit, the drive unit is connected to the rotating shaft and coupled to the control unit, and the rotating shaft is connected to the rotating element.

7. The feeding apparatus of claim 6, wherein a recess is disposed at a bottom of the rotating element, and the rotating shaft is connected to the recess.

8. The feeding apparatus of claim 7, wherein the rotating element further comprises a fixing pad fixed to one end of the rotating shaft which passes through the recess.

9. The feeding apparatus of claim 1, wherein the rotating element comprises a material-containing chamber disposed in the rotating element, and the discharge channel is in communication with the material-containing chamber.

10. The feeding apparatus of claim 9, wherein the discharge channel is obliquely disposed at the rotating element.

11. The feeding apparatus of claim 10, wherein the discharge channel has an inlet and an outlet, and the outlet is at a greater height than the inlet.

12. The feeding apparatus of claim 11, wherein the outlet is disposed on a side relative to a rotation axis of the rotating element.

13. The feeding apparatus of claim 1, wherein the feeding apparatus further comprising an image capturing module, and the image capturing module is disposed above the discharge channel.

14. The feeding apparatus of claim 1, wherein the rotating element is disposed on an upper side of the fixing element.

* * * * *